United States Patent [19]
Stokes

[11] 3,816,202
[45] June 11, 1974

[54] TIRE BUILDING METHOD AND MACHINE

[75] Inventor: James D. Stokes, Luxembourg, Luxembourg

[73] Assignee: The Goodyear Tire & Rubber Company, Akron, Ohio

[22] Filed: Nov. 1, 1971

[21] Appl. No.: 194,313

Related U.S. Application Data

[63] Continuation of Ser. No. 800,523, Feb. 19, 1969, abandoned.

[52] U.S. Cl. ............... 156/123, 156/124, 156/127, 156/128 I, 156/133, 156/401
[51] Int. Cl. ..................... B24h 17/08, B29h 17/22
[58] Field of Search ......... 156/123, 126, 127, 128 I, 156/132, 135, 400, 401

[56] References Cited
UNITED STATES PATENTS

| | | | |
|---|---|---|---|
| 2,217,607 | 10/1940 | Anderson et al. | 425/367 |
| 3,053,308 | 9/1962 | Vanzo | 156/132 X |
| 3,078,204 | 2/1963 | Appleby | 156/401 X |
| 3,171,769 | 3/1965 | Henley et al. | 156/132 |
| 3,265,549 | 8/1966 | Woodhall et al. | 156/132 |
| 3,375,151 | 3/1968 | Black et al. | 156/132 |
| 3,409,490 | 11/1968 | Pacciarini et al. | 156/123 |
| 3,414,446 | 12/1968 | Pearce et al. | 156/132 |
| 3,438,832 | 4/1969 | Cantarutti | 156/132 |
| 3,475,254 | 10/1969 | Henley | 156/123 X |
| 3,479,238 | 11/1969 | Kehoe et al. | 156/123 X |
| 3,490,980 | 1/1970 | Mallory et al. | 156/132 |
| 3,542,624 | 11/1970 | Nadler et al. | 156/401 |

FOREIGN PATENTS OR APPLICATIONS

| | | | |
|---|---|---|---|
| 1,519,771 | 2/1968 | France | 156/400 |
| 820,825 | 9/1959 | Great Britain | 156/126 |

*Primary Examiner*—Clifton B. Cosby
*Attorney, Agent, or Firm*—F. W. Brunner; R. S. Washburn

[57] ABSTRACT

A method and apparatus for building a tire including turnup of the ply endings around the tire beads onto the ply extending in cylindrical form between the beads followed by shaping of the tire carcass so formed into a toric form and applying additional components such as an inextensible belt and/or sidewall material thereto of particular advantage with ply reinforcing elements of notable stiffness. The ply endings extending outwardly beyond the beads are subjected to axial tension in a particular manner, enhancing the tightness of the endings about the beads.

The foregoing abstract is not to be taken as limiting the invention of this application, and in order to understand the full nature and extent of the technical disclosure of this application, reference must be made to the accompanying drawings and the following detailed description.

11 Claims, 11 Drawing Figures

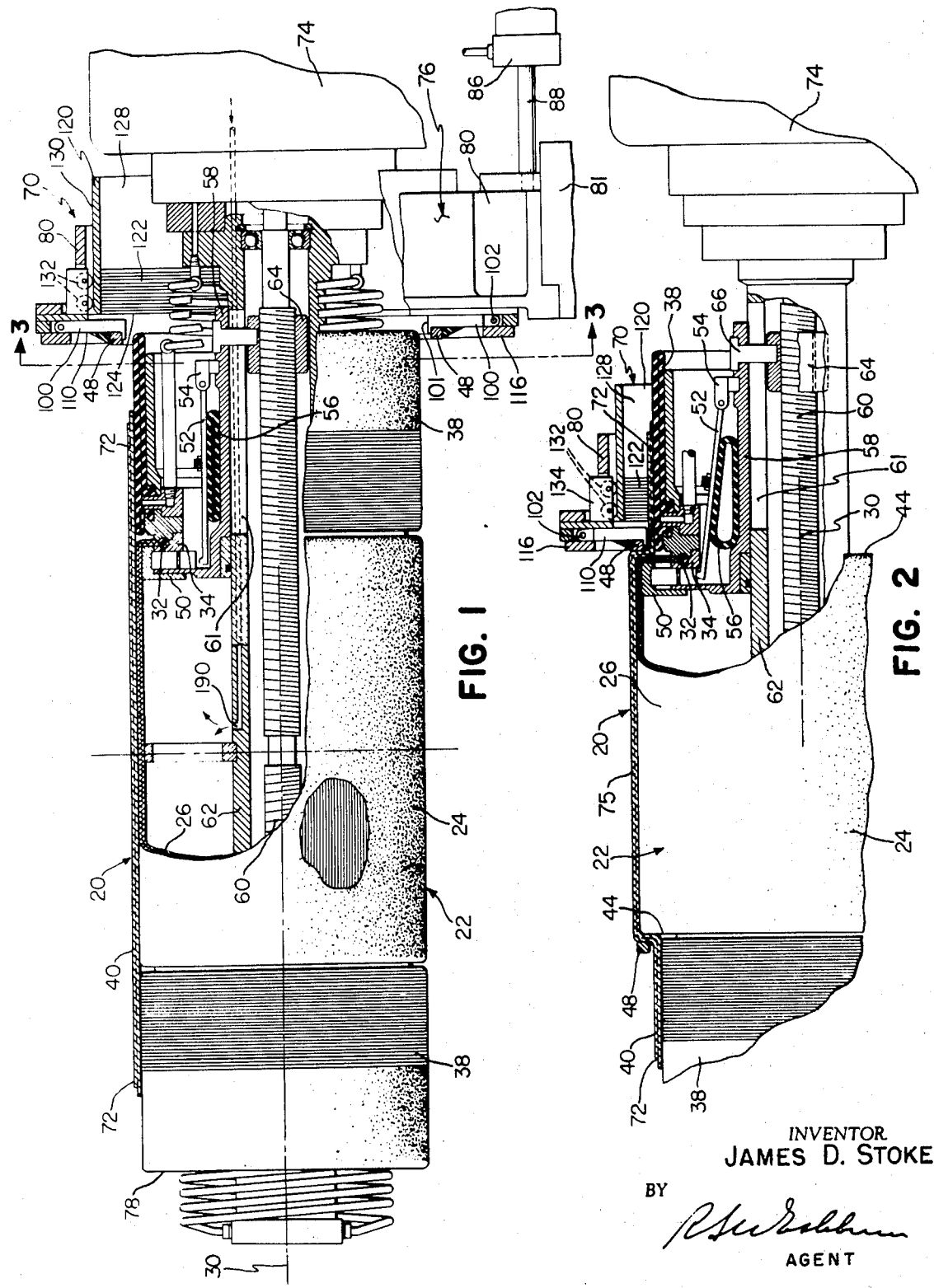

INVENTOR.
JAMES D. STOKES
BY
R. L. Washburn
AGENT

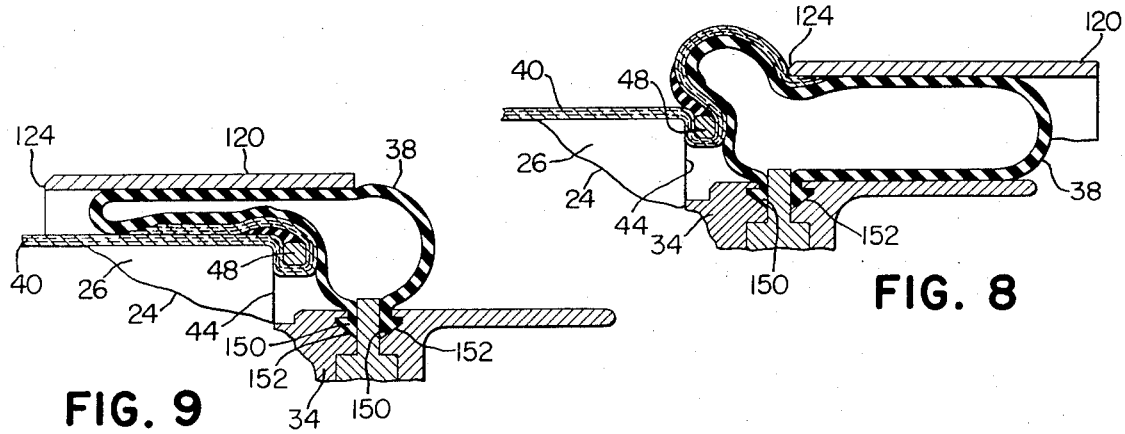
FIG. 9
FIG. 8
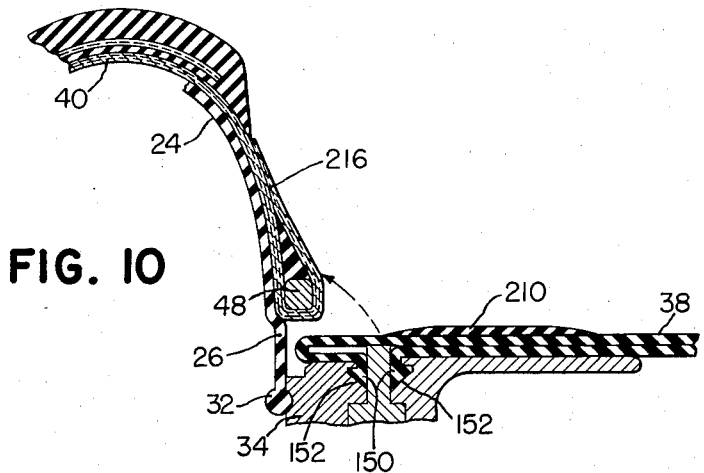
FIG. 10
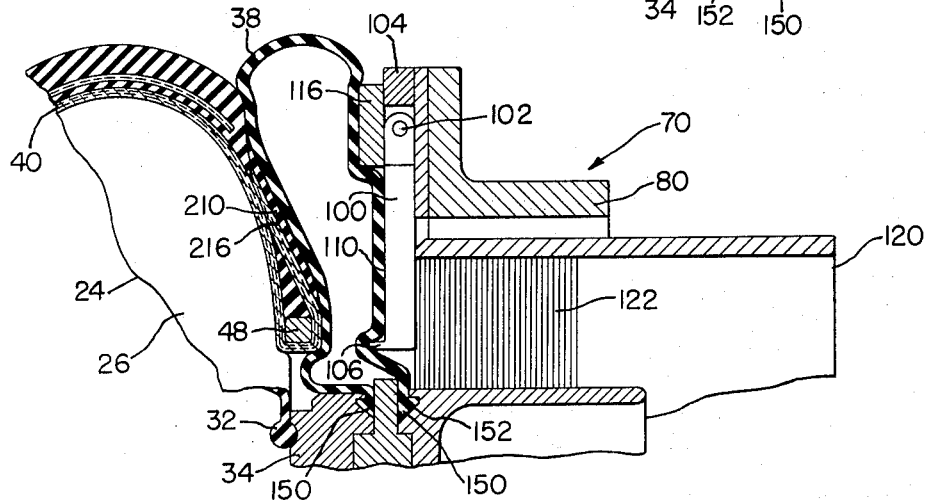
FIG. 11
INVENTOR.
JAMES D. STOKES
AGENT

TIRE BUILDING METHOD AND MACHINE

This is a continuation of application Ser. No. 800,523 filed on Feb. 19, 1969, now abandoned.

This invention relates to the art of tire manufacture and particularly to tire building. More particularly, the invention relates to apparatus adapted for cooperation with a tire building drum about which a tire ply or plies may be placed to form a cylindrical band, to place suitably in engagement with said band a pair of tire beads, to turn or wrap the outer end portions of the ply about the respective beads and into secure relation with portions of the band disposed between the beads, and to apply to the tire carcass so formed additional elements, such as a belt ply or plies and/or annular sidewall portions, while the carcass is in generally toroidal configuration.

In building pneumatic tires it is customary to form, in the ply or plies constituting the carcass, a circumferential seat or shoulder to receive the usual tire bead, one at each side of the tire. Following placement of the bead into engagement with the seat or shoulder, the ply endings are turned in such a manner as to enclose the beads tightly within the ply. Equipment for causing the ply skirts to be folded around the beads and adhered to portions of the tire carcass extending between the beads is in common use. The turnup of the ply skirts about the beads is frequently accomplished by using inflatable annular bladders placed coaxially with the tire building drum and closely adjacent to each bead receiving seat or shoulder. In order to provide accuracy and economy, devices for placing beads in true concentricity with the tire carcass and with the axis of the tire-building drum are commonly provided.

A principal object of the present invention is to provide for further improving the building of tires, and particularly for apparatus and methods having enhanced convenience and operability in placing the beads suitably with respect to the ply or plies forming the tire carcass, for turning or folding the ply endings about the beads in a particularly improved manner, and in applying further components, such as sidewall members, into place following expansion of the tire carcass into a generally toroidal configuration.

Other objects and advantages of the present invention will become apparent from or will be particularly pointed out in the description which follows herein of particular embodiments of the invention, referring throughout to the annexed drawings in which:

FIG. 1 is an elevation view of tire building apparatus adapted for the practice of the instant invention;

FIG. 2 is a partial elevation view of the apparatus of FIG. 1 showing a stage in the operation of the apparatus;

FIGS. 5 through 11 are schematic and partial sectional views showing respectively several stages in the operation of the apparatus of FIG. 1.

Figure 3:
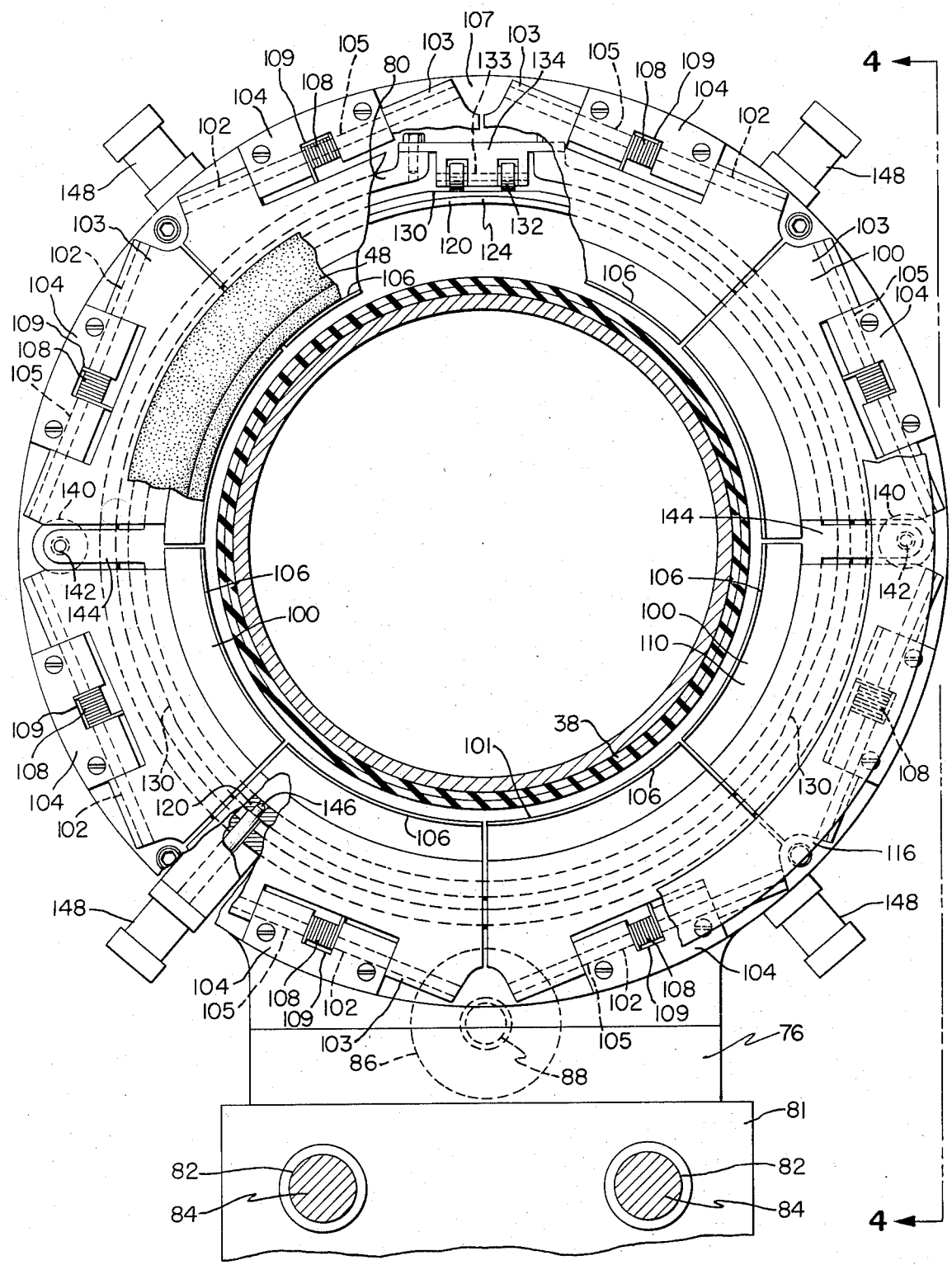
FIG. 3 is an elevation view taken as generally indicated by the line 3—3 in FIG. 1.

Illustrated in the drawings and particularly in FIG. 1, the tire building apparatus 20 embodying the present invention comprises drum means including a rotatable building drum 22 having a central drum portion 24, the ply receiving surface of which is provided by a tubular elastic element or membrane 26 having relatively inextensible cord reinforcements extending generally parallel to each other and to the cylindrical axis 30 of the drum between circular edges of the membrane which are upset to form annular rings 32 which are anchored in suitable grooves provided respectively within a pair of axially spaced support means or members 34 upon which are mounted also the inflatable annular turnup bladders 38 which, when deflated, have peripheral surfaces generally concentric with and providing extensions axially outwardly of the cylindrical surface of the central drum portion 24.

One or more plies 40 of tire cord fabric or the like can be wrapped about the drum 22 in cylindrical form in the usual manner, end portions of the plies extending axially outward of the portion 24 to lie upon the surfaces of the bladders 38. The reinforcing cords, wires, or like elements of the ply or plies 40, insofar as the present invention is concerned, may be of any suitable material including but not limited to nylon, rayon, polyester or metal. The cords of the plies may be oriented in any manner suitable for the building of either radial ply or bias ply tires. The term "cord" as used herein is intended to mean any linear element or strand of cable, wire, cord, or the like employed in reinforcing one or more plies of a tire.

As will be apparent from an inspection of FIGS. 1 and 2, the tire building drum 22 is provided with means for expanding the central drum portion 24 to provide bead receiving seats in the form of a pair of spaced apart coaxial annular shoulders 44 at the respective ends of the drum 24 and in the ply or plies 40 laid thereabout. Against the shoulders 44 are placed respectively a pair of inextensible annular rings or bead assemblies 48 which include the usual reinforcing wire bundle or core and may also include apex, flipper, or other known components forming a bead assembly, herein referred to as a bead. Means for forming the shoulders 44 in the tire building drum 22 comprise a plurality of circumferentially spaced rigid segments 50 mounted respectively to be radially movable within or with respect to the support means 34 under the influence of the levers 52 which at their respective axially outer ends are pivotally supported by a ring bracket 54 attached to the support means or member 34 and which levers are actuated by an annular inflatable tube 56 mounted upon the hub portion 58 of the support member 34 so as to cause the segments to move radially outwardly upon inflation of the tube 56, to form a bead locating shoulder in the membrane 26 at the ends of the drum portion 24.

Means preferably are provided to move each of the support members 34 axially an amount sufficient to compensate for the radial movement of the membrane effected during the formation of the shoulder. Axial movement of the support members 34 toward and away from each other and generally allochirally with respect to the mid-circumferential plane of the drum 24 is provided by the rotation of the right- and left-hand screw 60 relative to the drum 22 and its support shaft 62 such that the nut 64 affixed to the support member by the key 66 received within the longitudinal key slide or slot 61 is moved a suitable distance longitudinally or axially of the drum 22.

As will be appreciated, the means for moving the support members is operative in one end portion of the drum and substantially identical or equivalent means are provided in the other end portion of the drum. As will presently be more fully discussed, the drum means 22 is adapted to provide still another form, stage, or condition wherein the support members are moved axially toward one another cooperatively with a further expansion of the central portion 24 and membrane 26 such that the central drum portion 24 assumes a toroidal condition.

It will be apparent that various devices or arrangements may be employed to provide a seat for locating a bead assembly axially and radially with respect to the carcass, and that such a seat may be provided in various forms.

In accordance with the present invention, the tire building apparatus 20 includes the bladder turnup means here provided by the apparatus 70 for placing the bead assembly 48 against the shoulder 44 and for cooperating with the bladder 38 to cause the ply endings 72 to wrap tightly around the beads 48 and to secure the endings 72 to intermediate portions 75 of the plies 40 which extend in generally cylindrical band form between the respective beads.

It will be appreciated by persons skilled in the art that apparatus 70, shown in the drawings, is in all essential respects similar to apparatus provided, though not shown in the drawings, at the other end 78 of the tire building drum 22, except that the latter apparatus is arranged to be separable in a known manner from the end 78 of the drum 22 so as to permit beads to be passed over around the drum 22 and prepositioned prior to the tire building operation and to permit a completed (uncured) tire to be removed from the drum following the tire building operation. The present description will therefore be understood to apply to the apparatus 70 at either end of the tire building drum.

The apparatus 70 includes cage means, movable axially from a position axially outward and clear of the axially outward end of the bladder 38 to an axially inward position disposed about the central portion of the drum, and pusher means disposed axially between the cage means and the drum, the pusher means including bead setter means. The arrangement of the cage means and pusher means, both presently to be more fully described, provides particularly the advantage of requiring significantly less axial space between the drum 22 and the housing 74, in which the drum support shaft 62 is supported for rotation, so that the shaft 62 is shorter than heretofore required for providing movement of a cage or the like axially over and off from the tire building drum. A tire building machine in accordance with the present invention achieves very effective use of available floor space. The apparatus 70 further includes means for providing relative movement between the cage means and the pusher means coaxially of the drum as well as for relative movement between each of the cage means and pusher means and the drum. In the present embodiment the pusher means and the bead setter means are in combination.

As illustrated in the drawings, and particularly in FIGS. 1 and 3, the cage means and pusher means are mounted for relative movement as a unit with respect to the drum by a translatable carrier 76 including a generally cylindrical frame 80 disposed with its cylindrical axis substantially collinear with the axis 30 of the drum 22. The frame 80 is provided with a pedestal 81 having a pair of slide bearings 82 mounted on and movable axially along the cylindrical bars 84 which are mounted parallel to the axis 30 and which form a part of the tire building machine, enabling the carrier 76 to be moved coaxially of the tire building drum between a position axially outward of the drum a distance sufficient to permit inflation of the bladder 38 without interference with the cage means, as is illustrated in FIG. 1, and thence coaxially over and along the drum a suitable distance as will be further discussed presently. The translational movement of the carrier 76 may be provided by any conventional motor device, and in the present embodiment the carrier is moved as has been described by a fluid-powered reciprocating motor 86 having a piston rod 88 connected to the pedestal 81 in a conventional manner.

Figure 4:
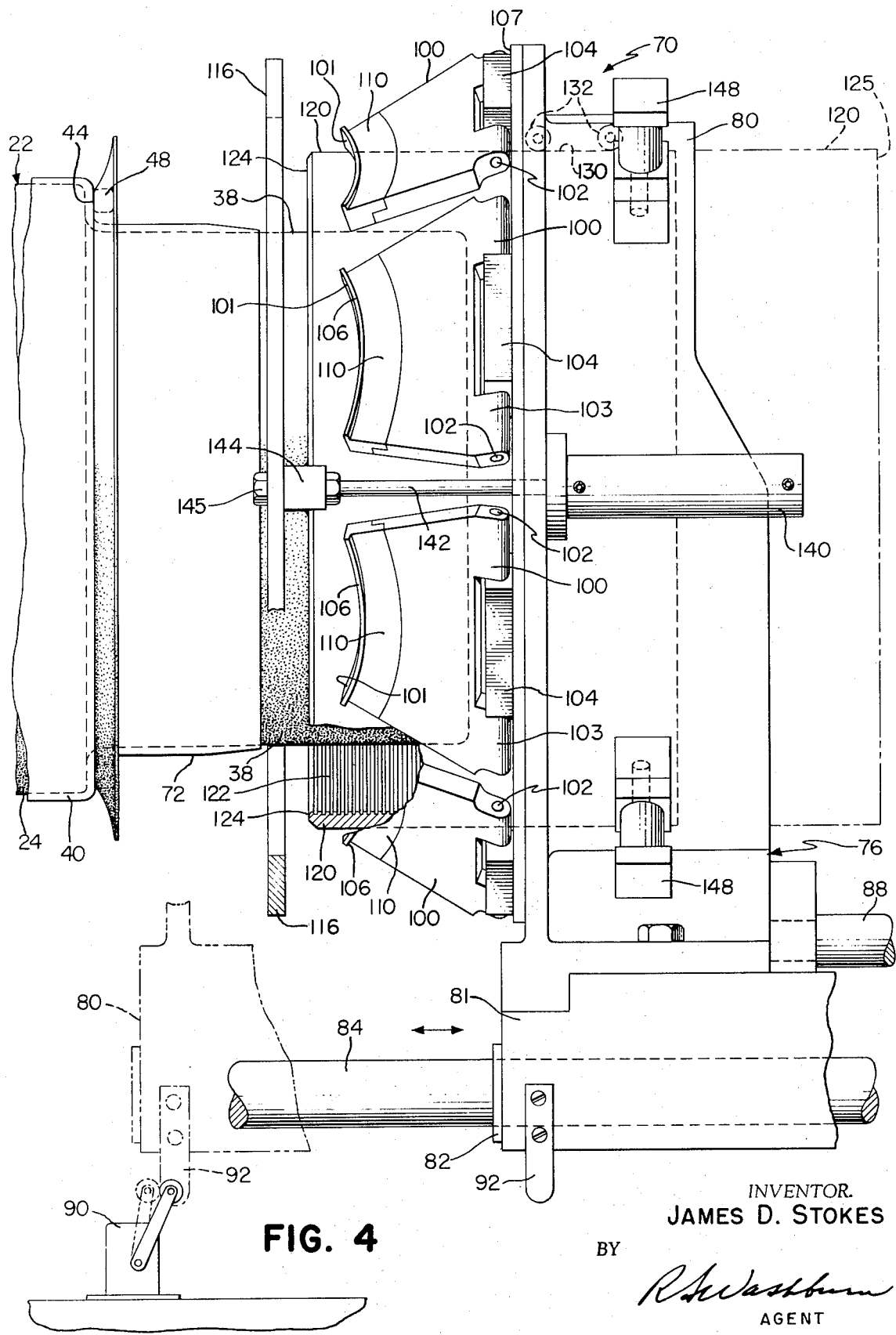
FIG. 4 is an elevation view taken as generally indicated by the line 4—4 of FIG. 3.
Figure 5:
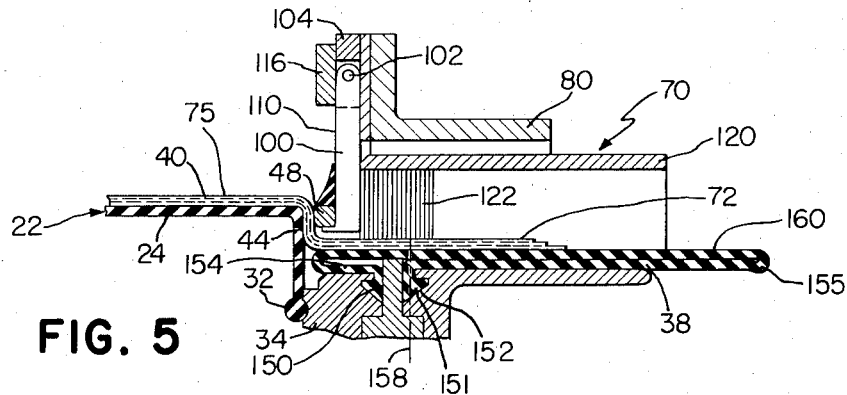

Illustrated particularly in FIG. 4, the apparatus 70 includes stop means, for control of the axial displacement of the carrier 76, in the form of a limit switch 90 adjustably fixed to a stationary portion of the tire building machine and a limit switch actuating cam 92 carrier by the carrier frame 80 and adjustably connected thereto. The limit switch 90 is connected electrically to a conventional solenoid actuated valve (not shown) for controlling the fluid, preferably oil hydraulic fluid, in the motor 86 in a conventional manner. The stop means is operative to locate the cage means in a particular manner subsequently to be described.

The pusher means comprises a plurality of members or segments 100 disposed generally radially of and concentric with the axis 30 of the drum 22. Each of the members extends radially outwardly from an inner parti-cylindrical surface 101 having a radius slightly larger than the radius of the outer surface of the bladder 38 in its deflated state such that the members 100 can be moved axially over the deflated bladder 38 without interference therewith. The members 100 extend outwardly, each terminating in an outer bifurcated end 103 disposed at a distance from the axis greater than the outer radial extent of cage means to be described and to a radial distance at least generally equal to the outer radial extent of the drum portion 24 when the membrane 26 is in its toric condition previously referred to.

Providing for swinging movement of the members, each bifurcated end 103 is bored to receive a hinge pin 102, the lengthwise dimension and cylindrical axis of which is generally perpendicular to a radius bisecting the arcuate width of the associated member 100. Each hinge pin 102 is received in a bore 105 in a bracket 104 which is attached to the face 107 of the flange of the frame 80. Each bracket 104 is provided with an opening 109 exposing a portion of the hinge pin 102 to accommodate thereon a coiled torsion spring 108 mounted about the pin 102 and having active spring ends bearing respectively against the bracket 104 and the member 100 so as to provide means urging the members toward a closed or radially oriented generally coplanar position as is illustrated in FIG. 3.

Each of the members of segments 100 extends annularly over generally equal arcuate widths between radially extending edges such that the plurality of members, in the present embodiment — eight, cooperate to form an annular pusher plate. Narrow generally radial spaces provide suitable clearance between respectively adjacent segments such that in the operation to be described the pusher plate affords generally continuous annular support when in engagement with the bladder 38.

Each segment 100 is provided on its radially inner end portion with an axially projecting lip 106 of particylindrical form concentric with and spaced outwardly of the surface 101, which lips 106 cooperate to provide a substantially cylindrical seat to receive and preposition the bead 48 in a location concentric with respect to the drum axis 30. Each segment 100 is provided with a plane radial surface 110 such that the plurality of segments support the bead placed on the lips 106 thereof in a plane perpendicular to the drum axis. The bead setter means provided by the lips 106 and the surfaces 110 of the pusher means is movable coaxially of the drum 22 by and with the movement of the carrier 76 from its axially outward position, illustrated in FIG. 1 to the position thereof illustrated in FIG. 2, where the bead assembly 48 is firmly placed or set against the shoulder 44 formed as previously described in the ply or plies on the drum 22. The bead 48 having been firmly adhered to the seat or shoulder 44, the carrier and the beadsetter means are moved axially away from the shoulder.

Bladder turnup means in accordance with the present invention include cage means which in the specific embodiment is in the form of a hollow circular sleeve 120 the inner cylindrical bladder engaging surface 122 of which is grooved, threaded, knurled, or similarly adapted to engage the ply skirt without significant axial slippage of the ply or plies with respect to sleeve 120. The sleeve 120 extends between a forward or leading edge 124 disposed toward the drum 22 and an outer or rearward edge 125 disposed axially away from the drum. The axial length of the sleeve 120 is less than or at least not greater than the axial length of the bladder 38 in its deflated cylindrical state. The sleeve 120 is fully open at each end and can be moved axially over the drum portion 24 any suitable distance, as will presently appear. The diameter of the inner surface 122 of the sleeve is substantially less than the diameter to which the bladder 38 can be inflated and is preferably sized to restrict the bladder 38 when the same is inflated within the sleeve to a minimum diameter sufficient to roll the bladder and the ply ends therewith over the shoulder formed in the ply or plies without having the inner and outer wall portions of the bladder interfere with or contact one another during the rolling movement. Generally, the diameter of the surface 122 will not exceed the outer diameter of the deflated bladder 38 by more than about 12 to 13 centimeters.

To provide for relative movement between the cage means and the carrier, a plurality of tracks 130, three in the present embodiment, are approximately equally spaced angularly about the outer cylindrical surface of the sleeve 120 and extend therealong parallel to the axis of the sleeve. Each track engages a set of rollers 132 rotatably mounted on a roller shaft 133 carried in a bracket 134 affixed to the frame 80 so that the cage means is movable, i.e., extendable and retractible, coaxially of the frame 80 as well as restrained from movement in other directions.

Relative movement between the pusher means described and the cage means is provided by means of a pair of fluidpowered cylinders 140 disposed on opposite sides of the frame 80 each of which cylinders has a piston rod 142 movable parallel to the axis 30 and connected to the forward edge 124 of the sleeve 120 by a lug 144 which is affixed to the sleeve by welds or the like. Outward movement of the piston rods 142 causes the sleeve 120 to be moved or extended outwardly of and coaxially of the frame 80 toward the drum 24. As the sleeve 120 is extended, the segments or members 100 are swung axially and radially outwardly about their respective hinge pins 102 in response to movement of the sleeve as the sleeve leading edge 124 engages the segments. Reverse movement of the piston rods, inwardly into their cylinders, causes the sleeve 120 to be retracted into the frame 80, away from the drum 24, and permits the segments to be returned to their closed position and substantially circular array under the influence of torsion springs 108. It will be appreciated that other means may be used to connect the cage means and the segments whereby the latter may be swung out with extending movement of the sleeve and swung into their closed position with retraction of the sleeve. As will be seen in the drawings, particularly in FIG. 4, the movement of the segments 100 into their open radially outward position permits the cage 120 to be moved axially through the pusher means and the bead setter means and further to enable relative coaxial movement between the cage means and the drum.

A further feature is provided by locking means movable with the cage means coaxially of the drum means, which locking means is in the form of a lock ring 116 mounted for coaxial movement with sleeve 120 and attached concentrically thereto by the lugs 144 to which the ring 116 is secured by the nuts 145 on the piston rods 142. The ring 116 is spaced axially from leading edge 124 by a distance approximately equal to the thickness of the segments 100 and radially outwardly from the sleeve 120 a distance sufficient to permit the segments 100 to swing outwardly as the sleeve is extended from the frame 80. In response to retraction of the sleeve 120, the lock ring 116 is moved axially into releasable locking engagement with the segments 100 radially inwardly of the hinge pins 102 so as to prevent movement of the segments out of their closed position. Fluid pressure acting in the cylinders 140 to retract and hold the sleeve 120 also acts to hold the ring 116 firmly against the segments 100 to hold them in their closed position.

Upon reaching its extended position, the sleeve 120 is there held against axial movement relative to the carrier frame 80 by a plurality of arcuately spaced pins 146 movable radially with respect to the sleeve by the operation of the cylinders 148 mounted on the frame 80. The pins 146 engage suitable seats in a sleeve 120 and are withdrawn therefrom by reverse operation of the cylinders 148 in order to permit the return of the sleeve to its retracted position.

The mode of operation of the apparatus 70 is illustrated in a series of schematic figures, FIGS. 5 through 11. Subsequent to the formation of the bead receiving shoulder 44 as has been described, the carrier 76, including the bead setter means with a bead 48 prepositioned on the lips 106, is moved toward the drum 24 to place the bead with its radially extending face in securely adhered contact with the shoulder 44, the concentricity of the bead 48 with respect to the drum 24 being assured by the lip portions 106 of the respective segments. The carrier 76 is thereupon withdrawn axially outwardly from the shoulder 44.

The turnup bladder 38 previously referred to, is formed of elastomeric material, cured in the form of an endless tubular band having a pair of upset edges 150, 151 suitably contoured to be secured in corresponding annular grooves 152 in the support member 34. An annular inner wall portion of the bladder extends from an edge 150 to a circumferential fold 154 of the band adjacent the shoulder 44 of the drum 24. A second inner wall portion extends from the other edge 151 to a circumferential fold 155 axially remote from the shoulder 44. An outer wall portion of the band extends from the fold 154 to the axially outer fold 155. Portions of the inner and outer walls of the bladder adjacent the fold 154 and laterally thereof to a circumferential line 158 are provided with increased extensibility in an axial direction relative to the remainder of the bladder by reduction in thickness of the elastomer comprising the walls. The bladder 38 is reinforced with cord fabric, the cords of which are disposed within the elastomeric material extending between the respective edges 150 of the band, making equal and opposite angles of from 65° to 78° with a circumferential centerline of the bladder. In the present embodiment angles of about 70° with the centerline have proved satisfactory. As will presently more fully appear the bladder is constructed to provide, when fully inflated to its natural shape free of external restriction, a diameter generally about equal to the diameter of the drum portion 24 when the latter is expanded into its toroidal condition as previously discussed and as may be seen in FIG. 11. Moreover, the peripheral length of the cross-section of the bladder 38 is sufficient to enable the bladder, while the same is restricted in its radial expansion, to roll axially over the bead 48 and the shoulder of the drum to stitch securely the entire axial length of the ply skirts to the ply material extending between the beads. The proportions of the bladder 38 shown in the drawings are representative only. Actual dimensions are to be determined to suit the particular tire to be built. The ply endings of tire carcass as built on apparatus herein described may extend outwardly of the beads an axial distance such that, when turned about the beads and adhered to the ply portions between the beads, the marginal edges of the turned up ply or plies extend into the sidewall or into the crown portion of the carcass beneath the tread. By alternating operation of the bladder turnup means associated with respective ends of the drum 22, the ply endings may be extended from one bead toward, to, or even beyond a mid-circumferential centerline of the carcass.

The outer surface of the bladder 38 is advantageously provided with circumferential ridges or the like to reduce the tendency for a ply skirt thereon to slip or slide axially of the bladder during initial stages of the inflation of the bladder.

Figure 6:
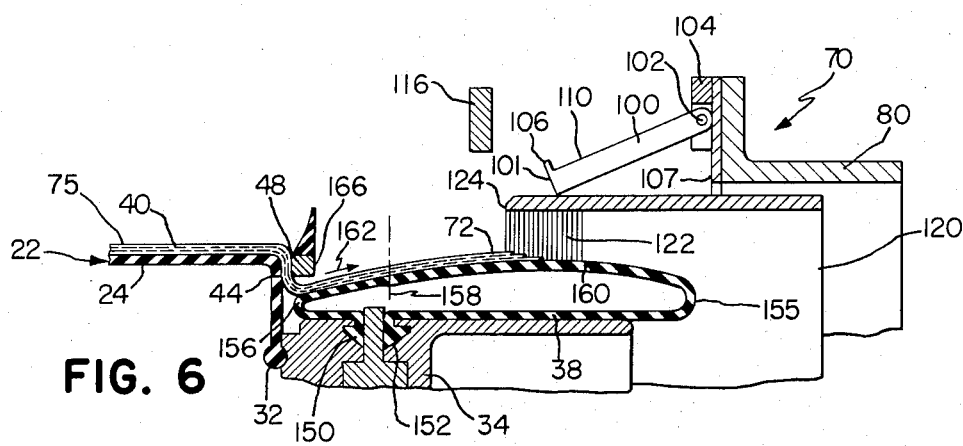
Figure 7:
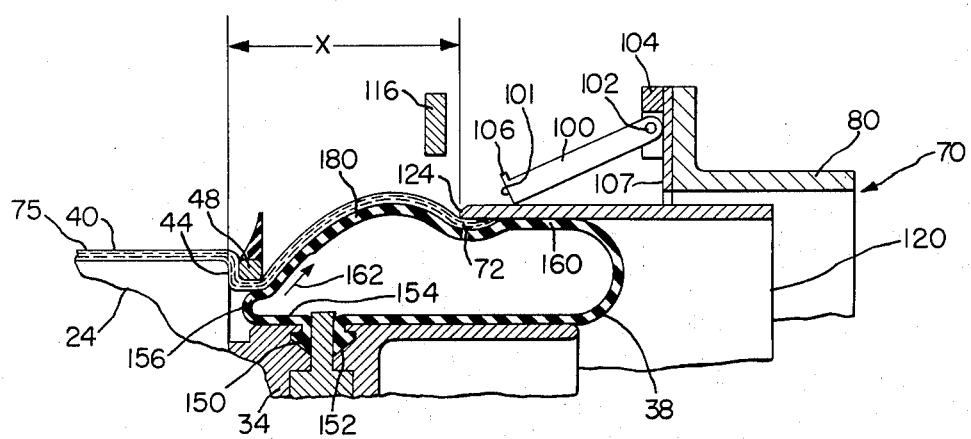

As may be seen in FIGS. 6 and 7, the sleeve 120 is extended from the frame 80 and the edge 124 of the cage is positioned a substantial distance axially outwardly from the shoulder 44, a distance X, and the inflation of the bladder 38 is begun. As the bladder is inflated the outer wall portion 160 moves radially and axially outwardly in the direction indicated by the arrow 162, so as to urge the ply or plies snugly first against the inner circumferential surface of the bead adjacent the shoulder 44, enabling contact circumferentially between the radially outer ply and the inner bead cylindrical surface to progress axially outwardly to the outer radial face 166 of the bead. Continuing expansion of the bladder 38 carries the ply skirt radially outwardly so as to engage at least the marginal edges of the skirt against the inner cylindrical surface 122 of the sleeve 120. Desirably, at least about 15 millimeters of the ply ending will be gripped between the bladder surface and the inner surface of the cage 120. The dimension X shown in FIG. 7, is desirably at least as great as the radial dimension of the annulus defined by the inner surface 122 of the cage 120 and the inner cylindrical surface of the associated bead 48, or of the outer surface of the deflated bladder which in general is disposed only slightly inwardly of the inner surface of the bead.

Spacing of the bladder engaging sleeve, and particularly its leading edge 124 axially outwardly of the bead, as indicated by the dimension X enables the circumferential zone of the ply ending disposed between the bead and the leading edge 124 to be expanded radially by the bladder to a radial displacement at least slightly greater than the radial displacement of the ply marginal edges engaged with the sleeve 120 and enables a significant increase in axial tension to be applied in the ply ending. By locating the edge 124, as described, the length of the sleeve 120 and thus the axial space required for its movement is minimized.

Turning now to FIGS. 8 and 9, the carrier 76, with the sleeve 120 extended and locked as has been described, is moved relatively coaxially over the drum 24, rolling the bladder 38 and the ply endings thereon snugly about the beads and stitching the ply endings securely to the plies extending in generally cylindrical form between the beads. As has previously been mentioned, the axial length of the sleeve 120 is less than the axial length of the bladder 38 when the latter is in its deflated state. The sleeve 120 is movable coaxially of the drum a distance at least equal to the axial length of the sleeve. Axial tension in the ply endings is maintained by the inflation pressure within the bladder during the rolling movement thereof.

It will be appreciated that the sequence of operations herein described in connection with FIGS. 5 through 9 is substantially continuous.

The apparatus herein described is also particularly adapted to operate in conjunction with tire building drums which expand a tire carcass formed thereon into substantially toroidal form. As previously pointed out herein the drum means 22 is capable of a plurality of forms and conditions including the condition of toroidal form previously discussed. A carcass built upon the drum 22 in generally cylindrical form is expanded into toroidal form around the circumference of which can be applied a tread and/or a relatively inextensible belt as used in the construction of radial ply tires.

Referring now to FIGS. 1, 10, and 11, the tubular membrane 26 of the central drum 24 is inflated into its toroidal state or condition, the members 34 being concurrently moved coaxially toward each other a suitable distance. The tire carcass carried by the drum is shaped thereby into generally toric or toroidal shape having a crown diameter suitable to receive directly therearound an inextensible belt, as well as a tread portion disposed circumferentially of the belt and the carcass.

With the carcass expanded into toroidal configuration, and with the bladder 38 again deflated as may be seen in FIG. 10, the tire building operation proceeds, a strip 210 of sidewall rubber being laid circumferentially about the turnup bladder 38 while the latter is deflated. As may be seen in FIG. 11, the turnup bladder is again inflated free of any external diametral restriction. The unrestricted expansion of the turnup bladder 38 carries the circumferential strip or band 210 of sidewall material into partial contact or at least proximity to the annular and generally radially extending sidewall portion 216 of the carcass ply carried on the now toroidally shaped drum. With the bladder 38 expanded and unrestricted, the pusher means, comprising the segments 100 mounted on the carrier is moved axially inwardly, moving the pusher means relatively with respect to the drum so as to bring the pusher means into engagement with the radially extending and axially outward portion of the bladder 38 as may be seen in FIG. 11.

The arrangement and procedure described are particularly advantageous in tire constructions in which the sidewall portion is desired to overlie the edge of the tread portion of the tire being constructed.

In order to stitch the strip 210 of sidewall material firmly against the sidewall portion of the carcass, the carrier 76 and pusher means urge the bladder 38 against the sidewall portion of the carcass while the drum 24 and particularly the membrane 26 are maintained in the toroidal condition by fluid pressure within the chamber defined in part by the membrane 26. Movement of the strip 210 of sidewall material from the generally cylindrical form which may be seen in FIG. 10 to the generally radially extending sidewall form which may be seen in FIG. 11 is essentially progressive, a contact between the strip 210 and the sidewall 216 being made generally at the radially innermost circumference and progressing outwardly in a manner such that entrapment of air or the like is prevented between the strip 210 and sidewall 216. Upon completion of the stitching of the sidewall, the apparatus 70 is again moved axially away from the drum, the bladders 38 are deflated, the members 34 are moved axially away from each other while the membrane 26 is being deflated, to restore the drum means 22 to its first state or condition and cylindrical form such that the completed tire is removable readily from the drum.

As will be evident from the foregoing description, the present invention provides several notable advantages. Pusher means comprising a plurality of members in a generally continuous and plane annular array is disposed conveniently proximate the bladder 38 to provide for stitching of a sidewall portion of a tire. The bead setter means being combined with the pusher means provides for conveniently accessible prepositioning of the bead assembly and for direct movement of the bead against the shoulder formed in the tire building drum. Following the placement of the beads, cage means is immediately available for suitably limiting the diametral expansion of the bladder and for rolling the same over the shoulder and the adjacent portion of the drum so as to provide for the roll-over and stitching of ply endings of any desired length. The combination of pusher means and cage means with means for moving both thereof axially with respect to the drum and relative to one another requires axial space between the end of the tire drum and the building machine housing which is small relative to the width of the drum itself, yet the cage means is capable of turning ply endings of axial length sufficient to approach or even overlie the mid-circumferential centerline of the tire when turned up about the beads.

In particular, radial expansion of the axially extending circumferential zone of the ply between the bead and the leading edge of the cage means, even though small in radial extent, provides significantly improved tightness of the wrap of plies about the bead even when the plies contain stiff wire reinforcing elements.

The invention may be practiced with advantage in the manufacture of various classes of tires, and is particularly useful in the building of tires employing reinforcement material of notable stiffness, such as wire or the like.

While certain representative embodiments and details have been shown for the purpose of illustrating the invenion, it will be apparent to those skilled in the art that various changes and modifications may be made therein without departing from the spirit or scope of the invention.

I claim:

1. A method of making a tire carcass comprising laying at least one reinforcing cord or wire ply, having parallel reinforcement cords or wires and breakable pick or weft threads extending transversely of said cords or wires, about a tire building drum; placing a tire bead in coaxial surrounding and circumferentially continuous axially fixed contact with said ply between a circumferential centerline and an edge of said ply; expanding radially the ply portion which extends between said bead and said edge so as to engage said edge in circumferentially endless contact with a circumferentially inextensible gripping sleeve spaced axially outwardly of said bead and to provide between said bead and said sleeve an axially extending circumferential zone; and thereby to inhibit the breaking of said pick or weft threads; and while holding said sleeve axially outwardly of said bead continuing to expand said zone to a circumference greater at its maximum extent than the circumference of said sleeve and to a lesser extent than that sufficient to break the pick or weft threads which space the cords or wires of the ply and to apply an axially outward pull throughout said portion; and then while maintaining said pull moving said sleeve axially inwardly to roll said portion over and around said bead.

2. A method of making a tire carcass as claimed in claim 1, limiting the expansion of said edge by means of said sleeve to an amount only sufficient to allow said sleeve and said edge to be moved over said bead so that the circumferential pitch or spacing of said cords or wires remains substantially uniform during said expansion.

3. A method of making a tire carcass as claimed in claim 2, including first forming a radially extending annular bead receiving seat in said ply and then moving said bead axially inwardly over said edge to said contact on said seat.

4. A method of making a tire carcass as claimed in claim 2 including rolling said ply portion positioned in said circumferential zone inwardly over the central portion a distance sufficient to adhere the respectively associated marginal edge of said portion on the said central portion at least approximately at the mid-circumferential plane of said cylinder.

5. A method of making a tire carcass as claimed in claim 2, including expanding said central portion from its cylindrical form to a toroidal form, applying circumferentially about said toroidal form an inextensible belt ply and a tread portion, and applying to the radially extending sidewall portion of the said toroidal form respectively circumferentially endless strips of tire sidewall material extending radially into adherent contact with the edges of said tread portion.

6. The method of making a tire carcass comprising forming a suitable length of tire reinforcement ply having parallel reinforcement cords or wires and breakable pick or weft threads extending transversely of said cords or wires into a generally right circular cylinder having an axially central portion and opposed axially outward allochiral end portions, expanding said central portion relatively of said end portions to provide radially extending axially outwardly facing bead receiving seats, setting a tire bead on each of said seats, expanding said end portions radially while concurrently exerting substantially in the full circumferential extent of said end portions an axially outward pull, preventing by a rigid inextensible ring expansion radially of at least the outer marginal edges of the end portions substantially in the full circumferential extent thereof beyond a first radially outward displacement with respect to said cylinder to inhibit the breaking of said pick threads, and effecting axial tension in said end portions increased with respect to the tension produced by said pull by expanding radially an axially extending circumferential zone disposed between the respective bead and the respectively associated marginal edge in each of said end portions to a second radial displacement at least slightly greater than said first displacement, and maintaining the so increased tension in said end portions while moving said end portions axially toward and around the beads and over the said central portion without increasing further the radially outward displacement of said end portions.

7. The method of making a tire carcass comprising forming a suitable length of tire cord fabric ply having parallel reinforcement cords or wires and breakable pick or weft threads extending transversely of said cords or wires into a generally right circular cylinder having an axially central portion and opposed axially outward allochiral end portions, locating a tire bead ring in concentric engagement with said cylinder respectively between the central portion and each of the respective end portions, expanding said end portions radially while concurrently exerting substantially in the full circumferential extent of said end portions an axially outward pull, preventing by a rigid ring expansion radially of at least the outer marginal edges of the end portions substantially in the full circumferential extent thereof beyond a first radially outward displacement with respect to said cylinder and thereby preventing non-uniform axial displacement of said edge relative to said ring, continuing to expand radially a circumferential zone disposed between the respective bead and the respectively associated marginal edge in each of said end portions to a second radial displacement greater than said first displacement, whereby an additional axially outward pull is exerted in said end portions, the axial length of said zone being at least as great as the first displacement, moving said end portions axially toward and around said beads and over said central portion without increasing further the radially outward displacement of said end portions while maintaining tension in the cords of the said end portions, and thereafter expanding said central portion from its cylindrical form to a toroidal form to receive therearound a substantially inextensible belt, and applying to the radially extending sidewall portions of the said toroidal form respectively circumferentially endless strips of tire sidewall material.

8. The method of making a radial tire comprising forming a suitable length of tire ply material having parallel tire reinforcing metallic wires and breakable pick or weft threads extending transversely of said wires into a generally right circular cylinder having an axially central portion and opposed axially outward allochiral end portions, locating a pair of tire bead rings respectively in concentric engagement with said cylinder between the central portion and the respective end portions, expanding said end portions radially and engaging at least the outer marginal edge of each of said end portions between an expandable annular member disposed coaxially within the respective end portion and a rigid annular member disposed radially outwardly of said cylinder and axially outwardly of the respective bead to inhibit breaking of said pick threads and irregular grouping or spacing of said wires, continuing to expand radially a circumferential zone disposed between the respectively associated bead and the respectively associated marginal edge engaged by said member to a radial displacement greater than the radial displacement of the respectively associated edge engaged with said rigid member, and rolling said end portions axially toward and over said central portion without increasing further the radially outward displacement of said end portion, so that the circumferential pitch or spacing between pairs of adjacent wires of the ply remain substantially equal during expansion of the end portions.

9. The method of making a tire including an inextensible circumferential belt comprising forming a suitable length of tire reinforcing material having parallel reinforcement cords or wires and breakable pick or weft threads extending transversely of said cords or wires into a generally right circular cylinder having an axially central portion and opposed axially outward allochiral end portions, providing a pair of bead engageable seats between the central and the respective end portions and placing tire bead rings respectively in said seats, engaging the inner cylindrical surface of said end portions respectively with a pair of coaxially disposed expandable annular bladders and expanding said end portions radially to engage at least the marginal edge portions thereof respectively with a pair of rigid annular members to prevent the expansion radially of at least said edges beyond a first radially outward displacement with respect to said cylinder, thereby inhibiting breakage of said pick threads and non-uniformity of spacing of said cords, effecting increased axial tension in said end portions and then moving said end portions axially toward and over said central portion without increasing further the radially outward displacement of said end portions and stitching said end portions to said central portion, thereafter expanding said central portion from its cylindrical form to a toroidal form, applying circumferentially about said toroidal form an inextensible belt ply and a tread portion, and applying to the radially extending sidewall portions of the said toroidal form respectively circumferentially endless strips of tire sidewall material extending radially into immediate adherent contact with the edges of said tread portion.

10. The method of making a tire as claimed in claim 6 including rolling a first one of said end portions inwardly over the central portion a distance sufficient to stitch the respectively associated marginal edge of said end portion to the said central portion at least at the midcircumferential plane of said cylinder and then rolling the other of said end portions inwardly over the said central portion to stitch the other of said marginal edges at least at the mid-circumferential plane of the cylinder.

11. The method of building a tire carcass comprising laying at least one ply of tire reinforcing cord material having parallel reinforcement cords or wires and breakable pick or weft threads extending transversely of said cords or wires about a tire building drum with an end of said ply extending axially outwardly of an end of said drum and overlying an inflatable turnup bladder disposed coaxially outwardly of and adjacent the end of the drum; placing a tire bead about said ply and inwardly of a respective edge of said ply; locating bladder turnup means including a cylindrical, circumferentially inextensible caging surface over the bladder with the caging surface being disposed coaxially of and radially outwardly of the bladder and with the end of said surface next adjacent the drum being disposed between the ends of the bladder so that said surface overlies a substantial part of the bladder; expanding radially the portion of said ply disposed between said bead and said end of said surface by inflating the turnup bladder; while so expanding said portion of the ply, caging said part of said bladder within said cylindrical surface to limit the radially outward expansion of said part to a diameter materially less than the diameter of said part when said bladder is inflated to its natural shape free of external restraint, said caging being effective to inhibit breakage of said pick threads and non-uniformity of spacing of said cords; moving said turnup means coaxially toward said drum while continuing said caging of said part to roll said bladder and said portion of the ply about said bead to adhere said portion to an other portion of said ply extending axially inwardly of said bead while said other portion is in substantially cylindrical form; then moving said turnup means axially outwardly of the drum to a position whereat said cylindrical surface is spaced axially outwardly of said bladder; deflating said bladder; expanding said drum to a generally toroidal form with said other portion of said ply thereon; laying a strip of tire sidewall material circumferentially about said deflated bladder to form an endless generally cylindrical band of said material on the radially outward surface of said deflated bladder; and reinflating said bladder with said sidewall band thereon free of restriction by said cylindrical caging surface and moving said turnup means axially toward said drum while the same remains in said toroidal form to urge the reinflated bladder axially toward said drum to adhere said band of sidewall material to said ply.

* * * * *